United States Patent
Chang

Patent Number: 5,501,527
Date of Patent: Mar. 26, 1996

[54] LINEAR MOVEMENT BALL GUIDEWAY

[76] Inventor: Jeff C. H. Chang, No. 46, 37th Rd., Taichung Industrial Park, Taichung, Taiwan

[21] Appl. No.: 175,953
[22] Filed: Dec. 30, 1993
[51] Int. Cl.$^6$ .................................................. F16C 31/06
[52] U.S. Cl. .................................................. 384/45
[58] Field of Search .................. 384/45, 43, 44; 464/168

[56] References Cited

U.S. PATENT DOCUMENTS

| | | | |
|---|---|---|---|
| 5,097,716 | 3/1992 | Barbat et al. | 384/45 |
| 5,108,197 | 4/1992 | Morita | 384/45 |
| 5,176,454 | 1/1993 | Schlereth | 384/45 |

*Primary Examiner*—Lenard A. Footland
*Attorney, Agent, or Firm*—Thomas M. Freiburger

[57] ABSTRACT

A linear movement ball guideway including a slide block, a guide rail and multiple loaded and unloaded ball members, wherein the slide block is composed of a slide block main body and two-end caps and the guide rail is formed with two lateral concave surfaces, while the slide block is formed with a corresponding convex surface and the concave surface and convex surface are formed with Gothic type ball member grooves defining lateral ball member passages within which the loaded and unloaded ball members circularly roll. An upper portion of the slide block are formed semicircular surface defining upper ball member passages, whereby a top point of the oaded ball member contacts with the semicircular surface, while a bottom point of the loaded ball member contacts with an upper surface fo the guide rail. The lateral loaded ball members bear the lateral force and moment in any direction from the slide block and enable the guide rail to bear stronger load and shear force. The upper ball members bear the upper load and torque and adjust the pre-load and correct the installation geometric error of the lateral ball members. The lateral ball member passages include 90 degree or straight lateral turning grooves, including an assistant turning block for smoothly guiding the loaded ball members into unloaded ball member holes. An engaging snap spring means is disposed between the end caps to hold the lateral ball members and prevent the same from dropping outside the guide rail.

6 Claims, 11 Drawing Sheets

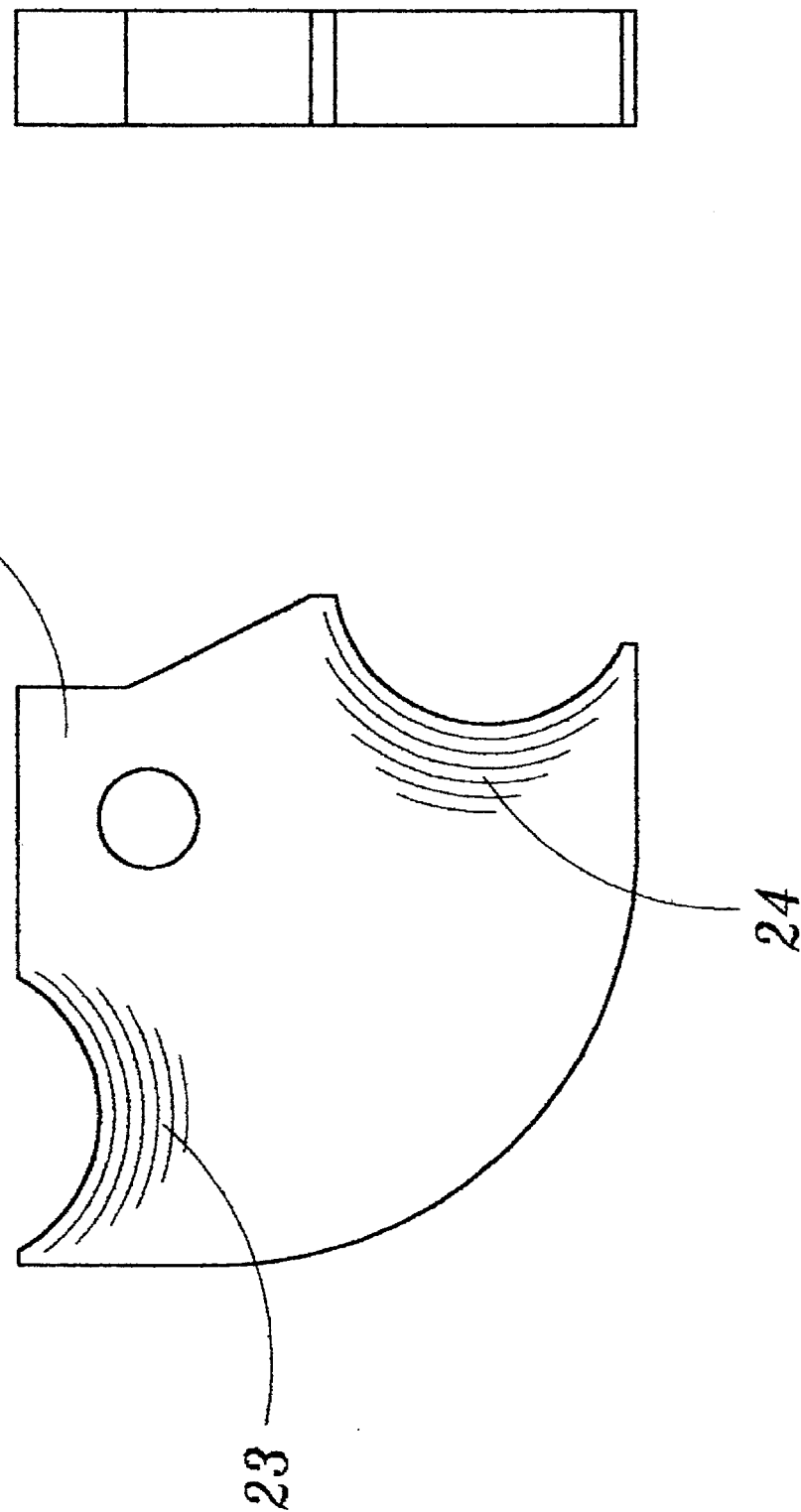

LINEAR MOVEMENT BALL GUIDEWAY

BACKGROUND OF THE INVENTION

1. Field of the Invention

The present invention relates to an improved linear movement ball guideway, and more particularly to a linear movement ball guideway which includes a slide block, a guide rail and multiple loaded and unloaded ball members, wherein the guide rail is formed with two lateral concave surface, while the slide block is formed with corresponding convex surface and the concave surface and convex surface are formed with Gothic type ball member grooves defining lateral ball member passages. An upper portion of the slide block are formed semicircular surface defining upper ball member passages, whereby a top point of the loaded ball member contacts with the semicircular surface, while a bottom point of the loaded ball member contacts with an upper surface of the guide rail, whereby the turning movement of the ball members is smoothened and the load-bearing ability thereof is increased. Also, the manufacturing of the guide rail and slide block is facilitated. (FIG. 1)

2. Description of the Prior Art

A conventional linear movement guideway is shown in FIG. 2. The guide rail 1 and slide block 2 thereof are respectively formed with two pairs of lateral Goethe type grooves 3 and 4, whereby multiple loaded ball members 5 are disposed therein to bear the load on the slide block 2. The slide block 2 includes two end caps formed with turning grooves 8 so that the ball members 5 can circularly roll within the Gothic type grooves with the slide block 2 continuously linearly sliding forward along the guide rail 1. In such design, the load in all directions will be born by the lateral Gothic type contacting ball members 5 so that when the ball members 5 bear the upper load, a slide deflection will take place. During manufacturing, if the contacting profile of the lateral ball members is poor, the slide deflection will be greater and the bearing ability of the ball members will be greatly reduced and the installation accuracy will be difficult to be controlled. Moreover, the ball member turning passages 8 of the end caps 6 are limited by the width of the slide block main body 7 so that the ball members can hardly turn through large distance and the smoothness of the turning movement of the ball members will be reduced.

SUMMARY OF THE INVENTION

It is a primary object of the present invention to provide an improved linear movement ball guideway to eliminate the above shortcomings of the prior art. As shown in FIG. 3, the linear movement ball guide way of the present invention includes a guide rail 1, a slide block 2 and two lateral groups of ball members 5 and two upper groups of ball members 15. The ball members circulate between the end caps through specific recirculation passages, permitting the slide block 2 to be guided by and smoothly slide along the the guide rail 1 to frictionlessly smoothly linearly transfer the load on the slide block along the guide rail. The slide block 2 is composed of a slide block main body 7 and two end caps 6 associated therewith. The lateral groups of loaded ball members 5 are disposed between a Gothic type passage 3 formed on lateral concave surface 9 of the guide rail 1 and corresponding Gothic type passage 4 formed on lateral convex surface 10 of the slide block main body 7. Therefore, due to the concave surface 9, the guide rail 1 can bear stronger shear force. Because the Goethe type contacting surface is located at the concave surface 9 of the guide rail 1, the slide block 2 has larger bearing surfaces 10 and 4 to bear greater downward load. Also, the convex surface of the slide block 2 enlarges the lateral solid portion 13 thereof for forming larger turning grooves. Therefore, both 90 degree turning groove and straight turning groove (FIG. 10) can be formed on the slide block 2. In addition, the enlarged solid portion 13 permits a ball member-retaining member and an assistant turning block 14 (FIG. 3 & FIG. 7) to be disposed in the slide block 2 to hold the ball member and smoothen the turning movement thereof. On an upper contacting portion of the slide block 2 near two lateral sides thereof are formed semicircular surface 11 defining upper ball member passages. A top point of the loaded ball member 15 contacts with the semicircular surface 11, while a bottom point 12 of the loaded ball member 15 contacts an upper surface of the guide rail 1. The upper ball members 15 serve to share the downward load with the lateral ball members and increase the contacting rigidity therebetween and balance the load on the contacting surfaces of the two lateral groups of ball members. The lateral loaded ball members bear the lateral force and moment in any direction from the slide block and enable the guide rail to bear stronger load and shear force. The upper ball members bear the upper load and torque and adjust the pre-load and correct the installation geometric error of the lateral ball members. The lateral ball member passages include 90 degree or straight lateral turning grooves, including an assistant turning block for smoothly guiding the loaded ball members into unloaded ball member holes. An engaging leaf spring means is disposed between the end caps to snap the lateral ball members and prevent the same from dropping outside the guide rail. In addition, the upper ball members serve to adjust the pre-load and installation accuracy of the lateral groups of ball members. Also, the upper ball members achieve a safety protecting effect in such a manner that when any of the lateral groups of ball members fail to roll, the upper ball members can balance the load and make sure a safety movement of the ball members without damage and resistlessly abruptly ascending phenomenom. The two upper groups of ball members are held between the two end caps by a retainer member 16 or two engaging snap springs 21 (FIG. 3 & FIG. 8) to limit the linear movement of the ball members 15. The ball members turn through the end caps 6 in a three-ball pushing turning passage 18 with optimal short distance as shown in FIG. 6C, wherein the ball members 15 turn by means of the outward sliding pushing force therebetween so as to achieve a smooth turning movement. The above arrangements can eliminate the drawbacks of the conventional device and increase the bearing ability of the ball members as well as increase the accuracy of the guide rail. The upper retainer member 16 (shown in FIG. 9) is fixed between and supported by the two end caps and can be substituted by two snap springs 21 for each loop of ball members to save parts and achieve a similar effect. (FIG. 11). The upper ball members circulate directly through the upper semicircular grooves of the end caps, while the slide block main body is formed with upper holes for the turning movement of the ball members. The assistant turning block 14 is fixed in the lateral semicircular turning groove by fixing pin 25 for assisting in smoothening the turning movement of the ball members. Four screws 26 go through four corners of the end cap 6 to lock the end cap 6 on a front and a rear face of the slide block main body 7 to integrally form the slide block 2. The end cap 6 is further formed with a lubricant passage and a lubricant inlet, whereby the lubricant can be fed through the inlet into the lubricant passage to be distributed to the four passages of the ball members.

The present invention can be best understood through the following description and accompanying drawing, wherein:

BRIEF DESCRIPTION OF THE DRAWINGS

FIG. 7 is a plane view of the assistant turning block for assisting in the turning movement of the lateral ball member of the present invention;

FIG. 7A is a side view according to FIG. 7;

DETAILED DESCRIPTION OF THE PREFERRED EMBODIMENTS

Figure 1:
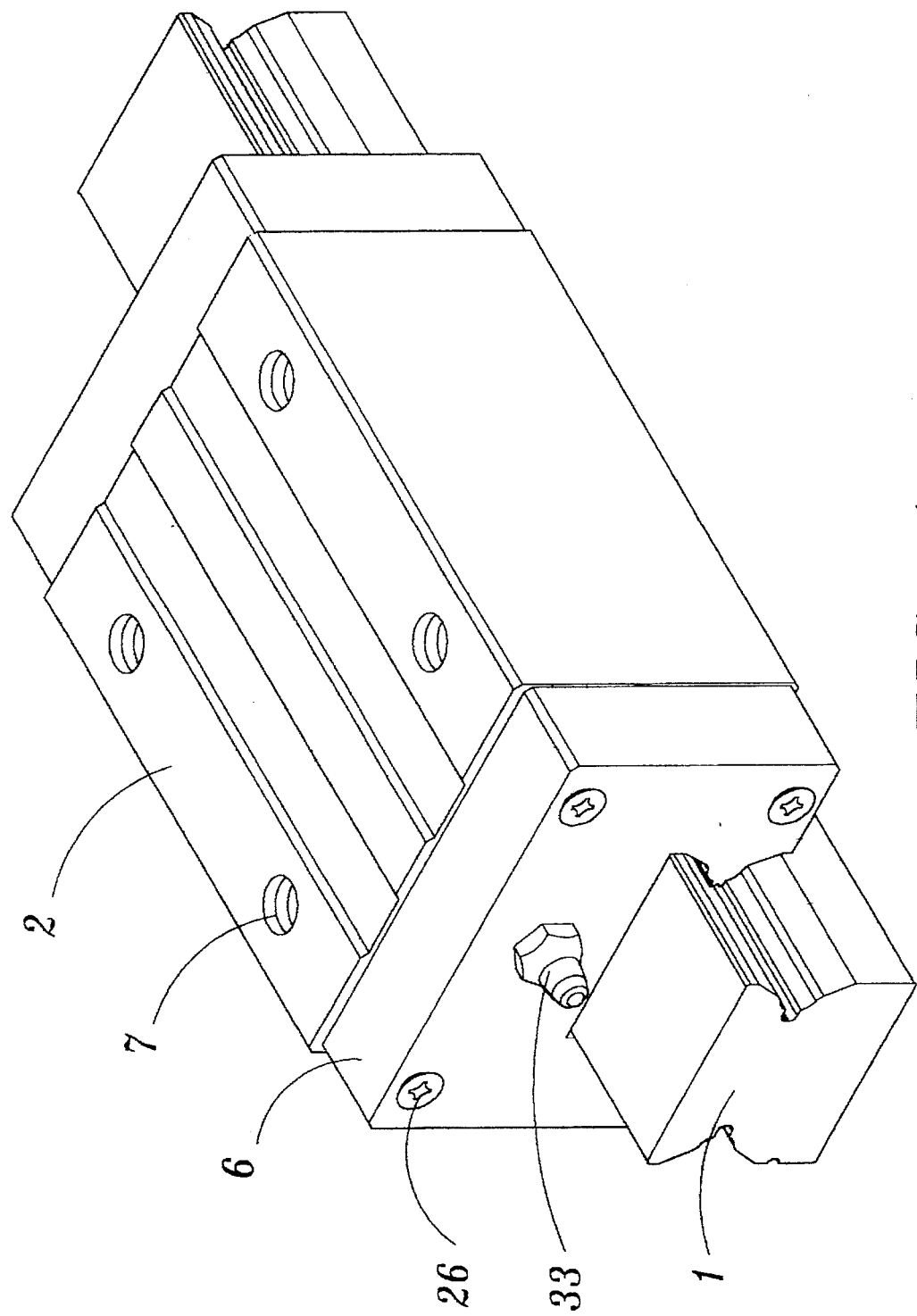
FIG. 1 is a perspective assembled view of the present invention.
Figure 2:
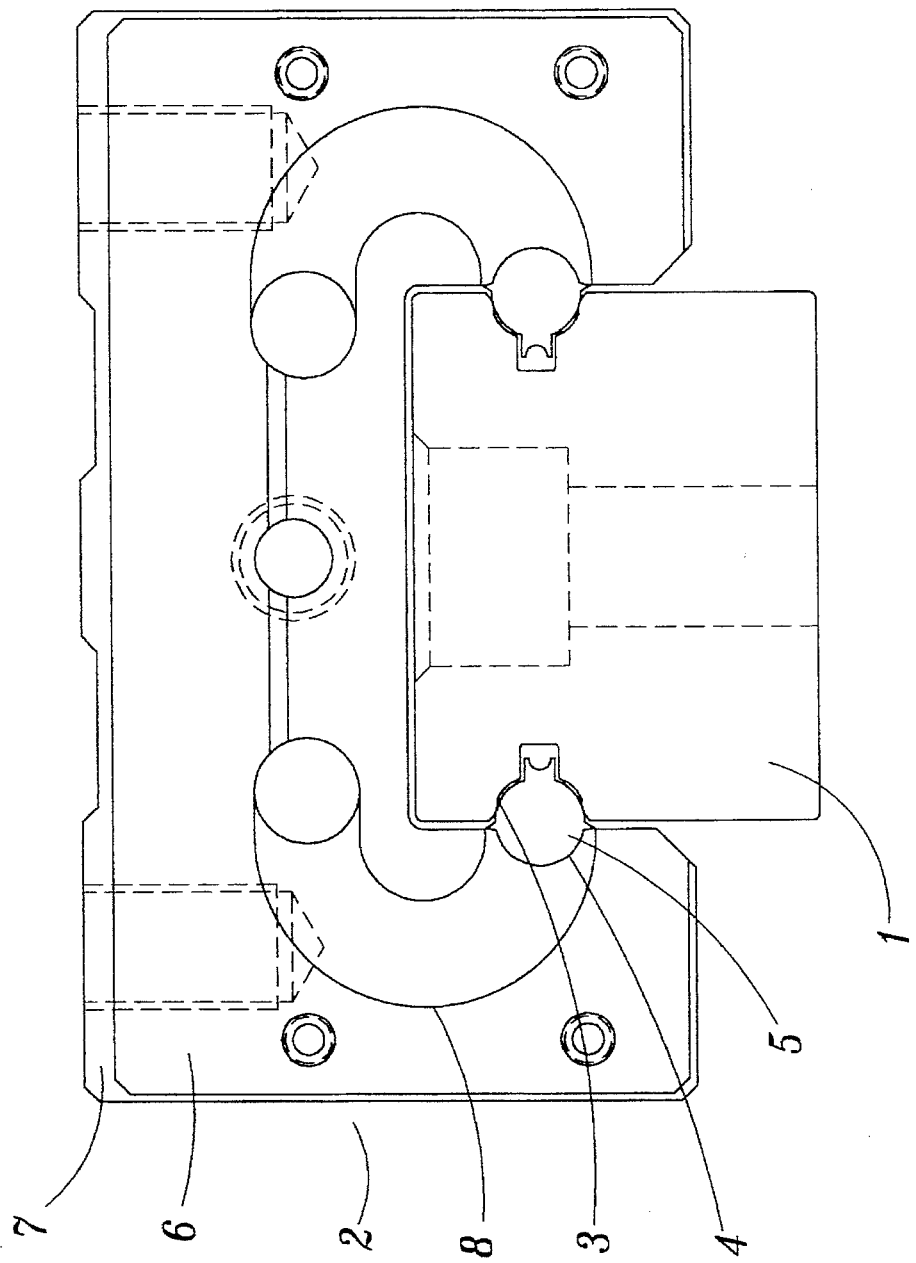
FIG. 2 is an assembled sectional view of a conventional slide block (including end caps) and a conventional guide rail.
Figure 3:
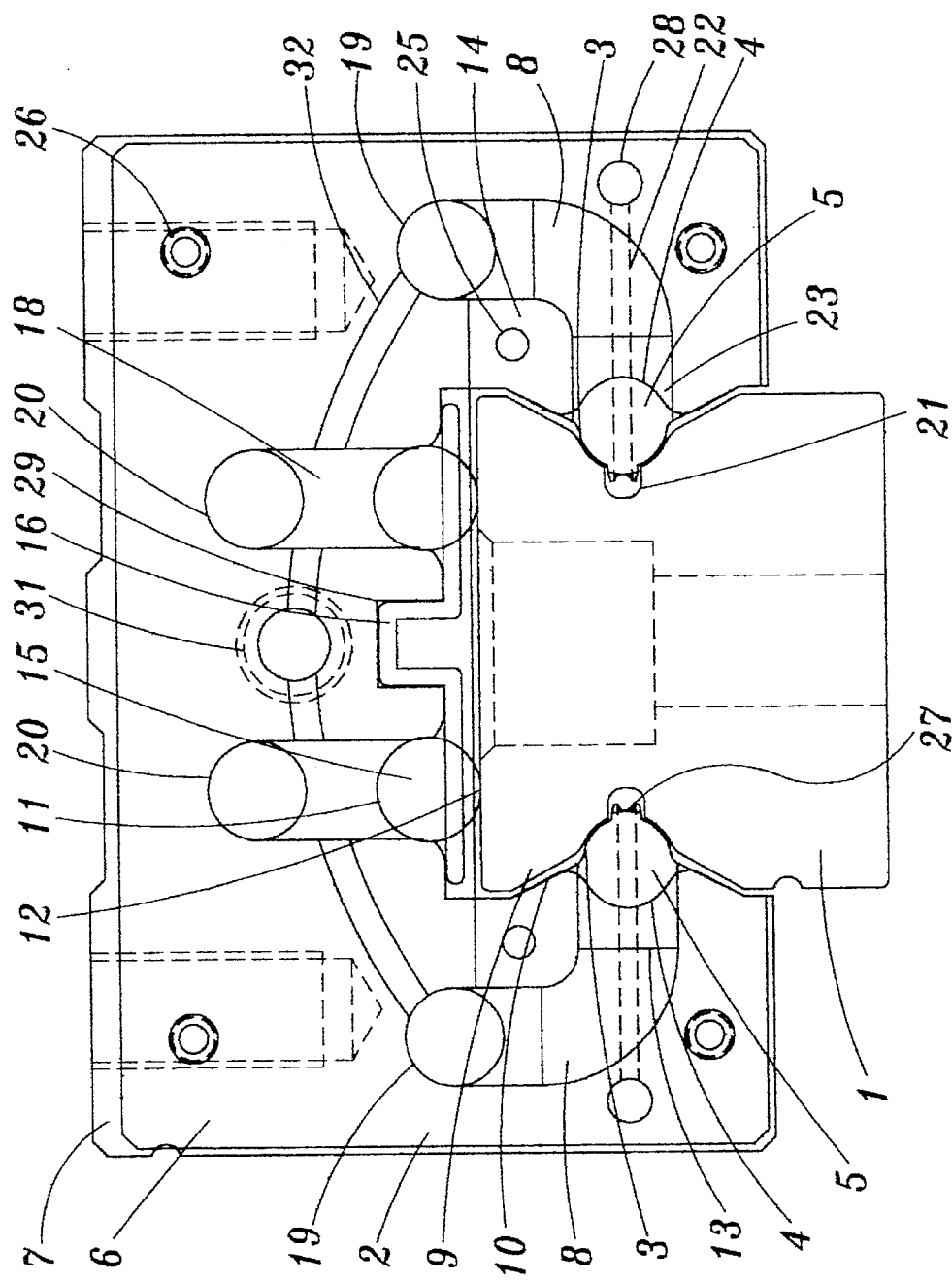
FIG. 3 is an assembled sectional view of the slide block (including end caps) and guide rail of the present invention.
Figure 4:
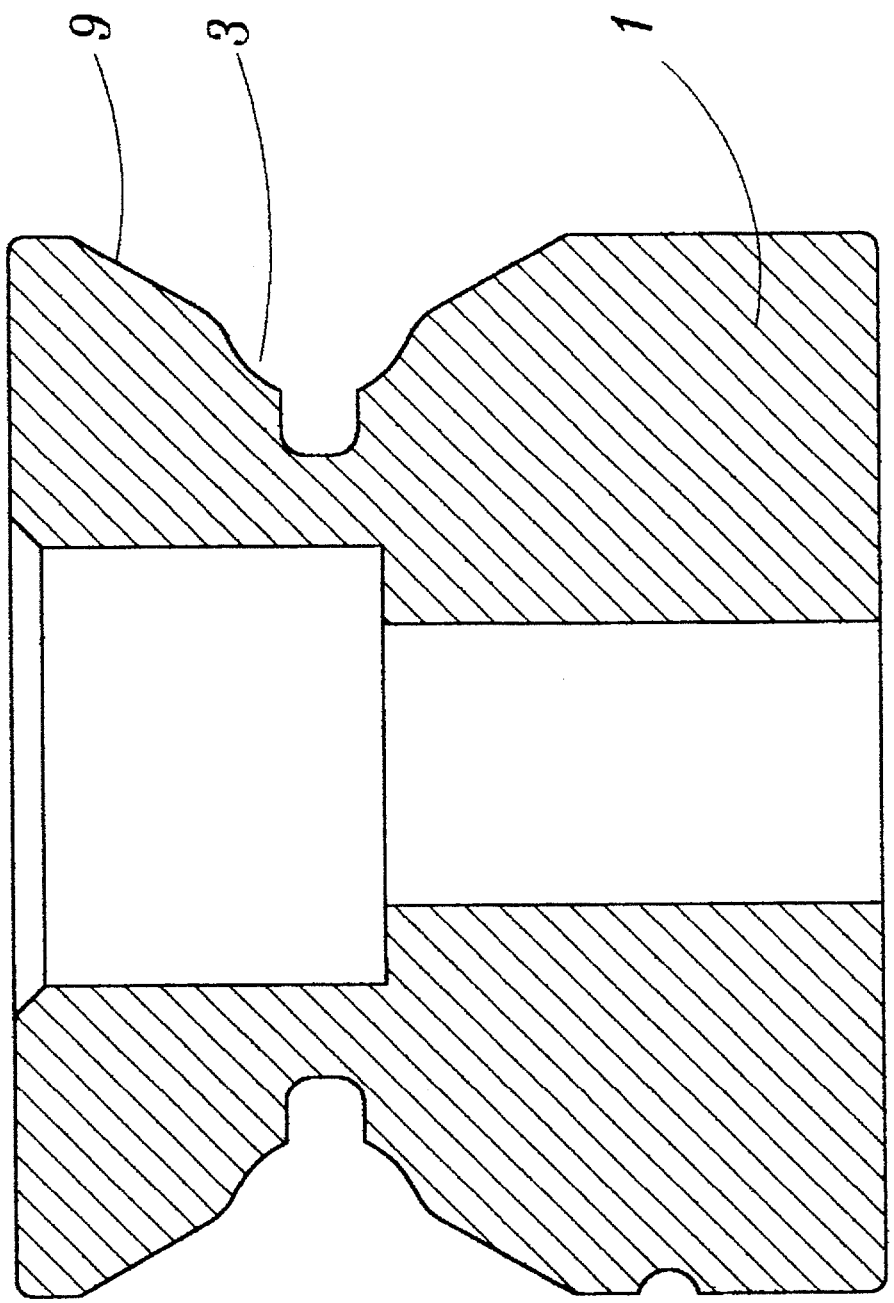
FIG. 4 is a sectional view of the guide rail of the resent invention.
Figure 8:
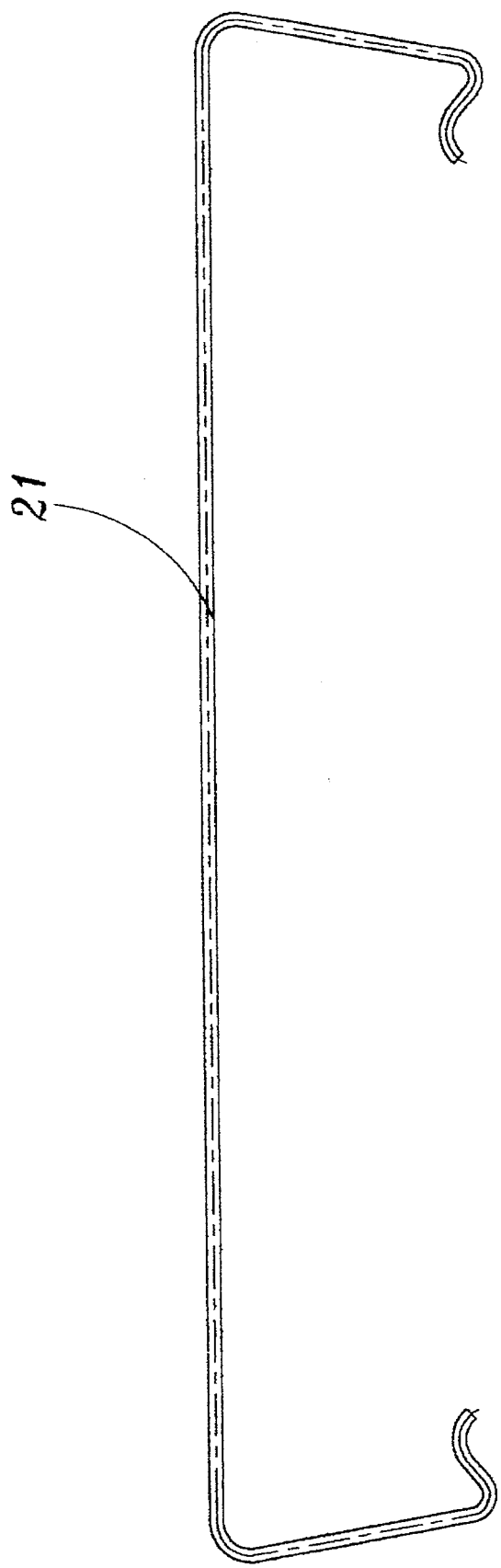
FIG. 8 is a side view of the engaging snap spring for holding the lateral ball members of the present invention.
Figure 9:
FIG. 9A is a plane view of the retainer member for holding the upper ball members of the present invention.
FIG. 9B is a front side view according to FIG. 9A.
FIG. 9C is a right side view according to FIG. 9A.
Figure 9:
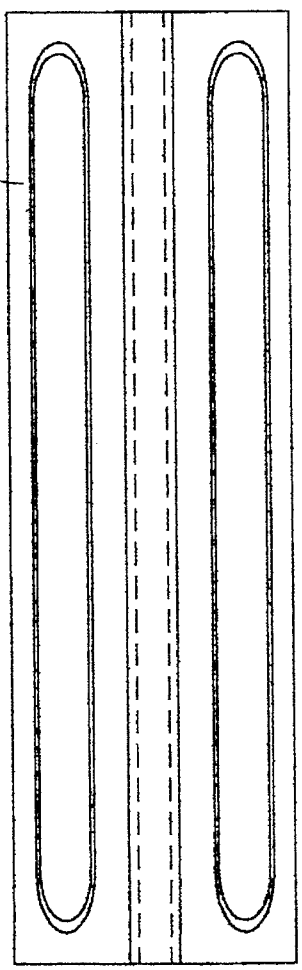
Figure 9:
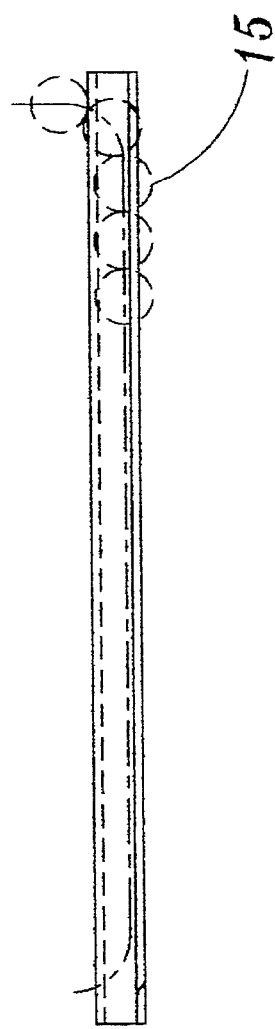

Please refer to FIGS. 1 and 3. The present invention includes a guide rail 1, a slide block 2, a retainer member 16 (as shown in FIGS. 3, 9A, 9B and 9C engaging snap springs 21 (FIG. 3 & FIG. 8) and two lateral groups of ball members 5 and two upper groups of ball members 15. The slide block 2 is composed of a slide block main body 7 and end caps 6 associated therewith by screws 26. The two lateral and two upper groups of ball members 5, 15 respectively pass through opposite semicircular grooves 8, 18 of the end caps 6 and turn into two pairs of the slide block main body 7 to perform circularly linear movement. The upper retainer member 16 is used to hold the ball members 15 so that when the slide block 2 and the guide rail 1 are separated, the ball members 15 will not drop outsides and thus the installation of the ball member 15 into the slide block 2 is facilitated as shown in FIG. 9B. The engaging snap springs 21 are secured on two lateral engaging seats 28 of the end caps 6 for preventing the ball members 5 from dropping outsides so as to facilitate the installation thereof.

Figure 6B:
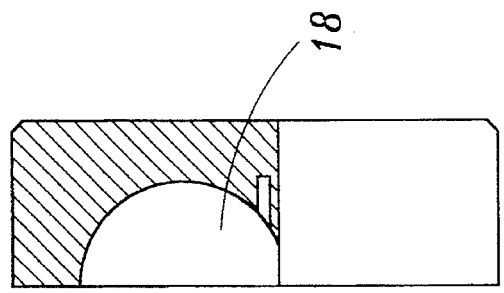
FIG. 6B is a sectional view taken along line B—B of FIG. 6.
Figure 6:
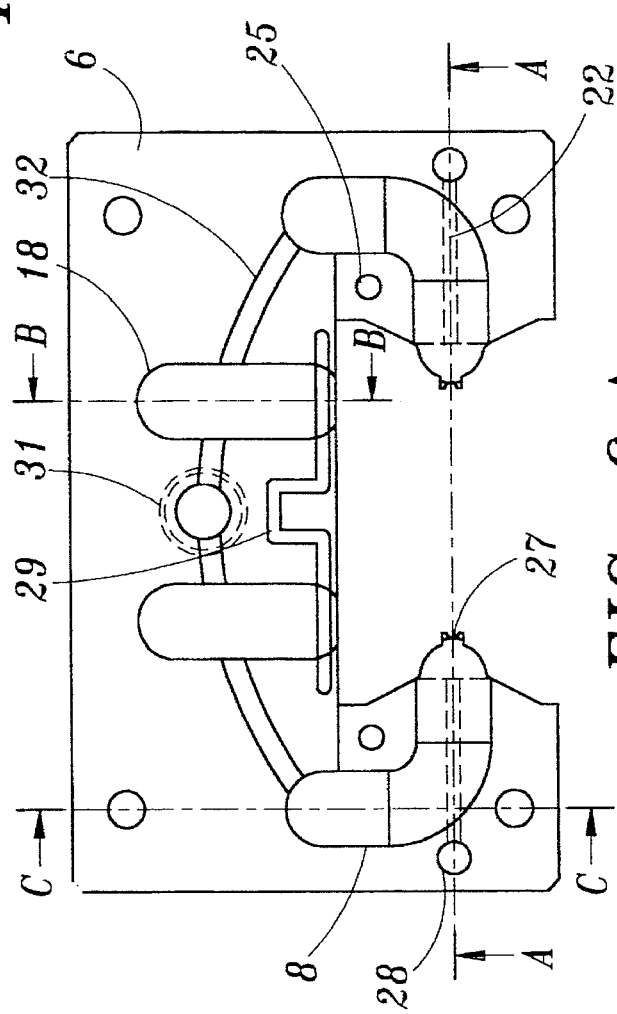
FIG. 6 is a sectional view of the end cap of the present invention.
Figure 6A:
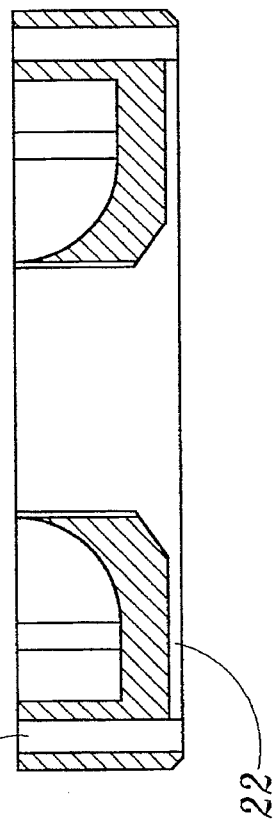
FIG. 6A is a sectional view taken along line A—A of FIG. 6.
Figure 6C:
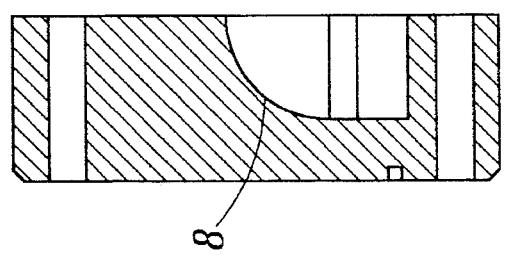
FIG. 6C is a sectional view taken along line C—C of FIG. 6.
Figure 10:
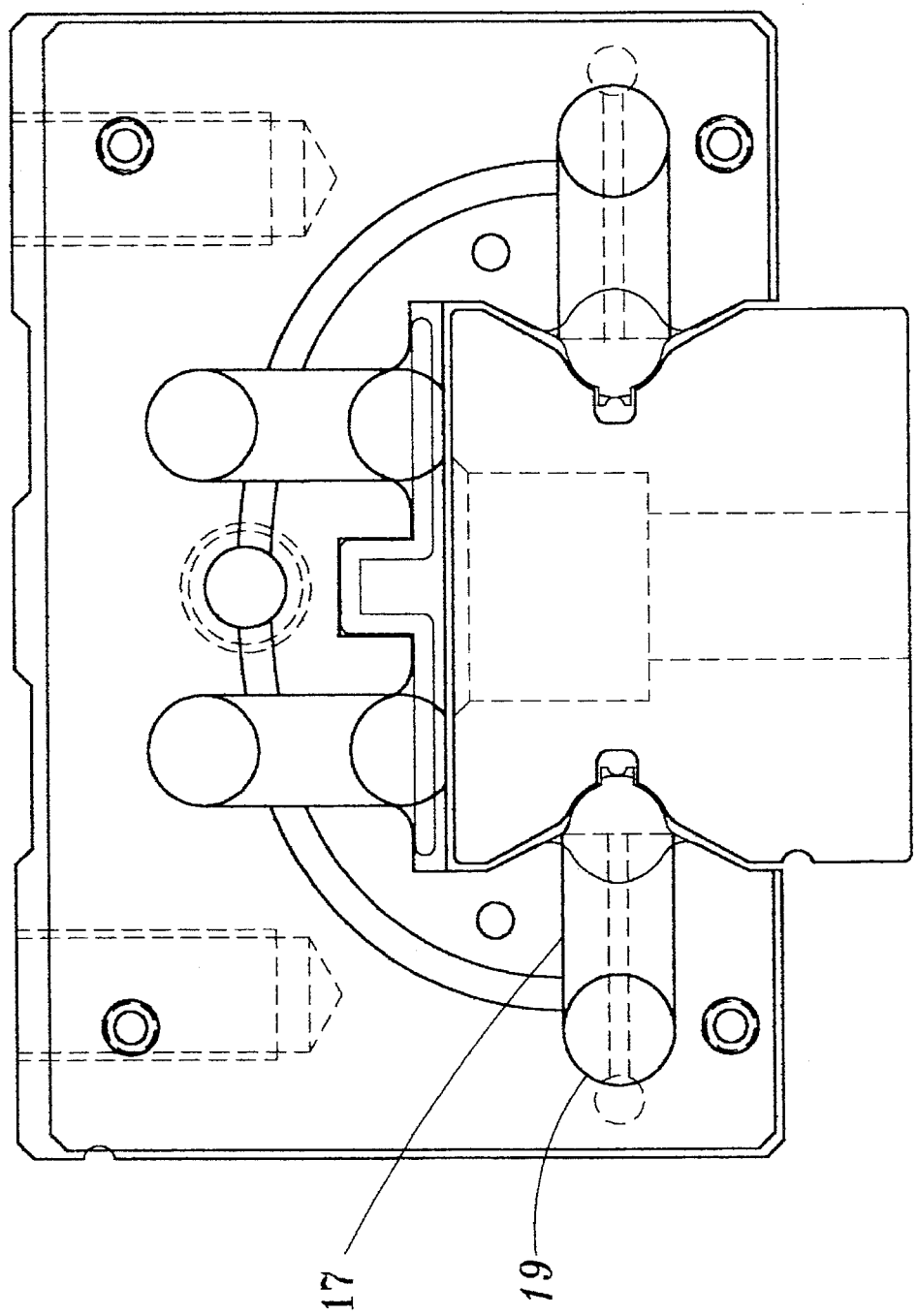
FIG. 10 is a plane view of another embodiment of the slide block main body and end cap of the present invention.
Figure 11B:
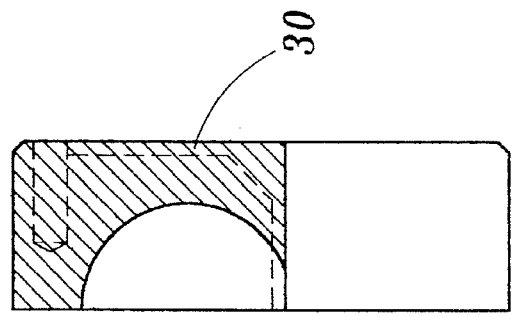
FIG. 11B is a sectional view taken along line B—B of FIG. 11.
Figure 11:
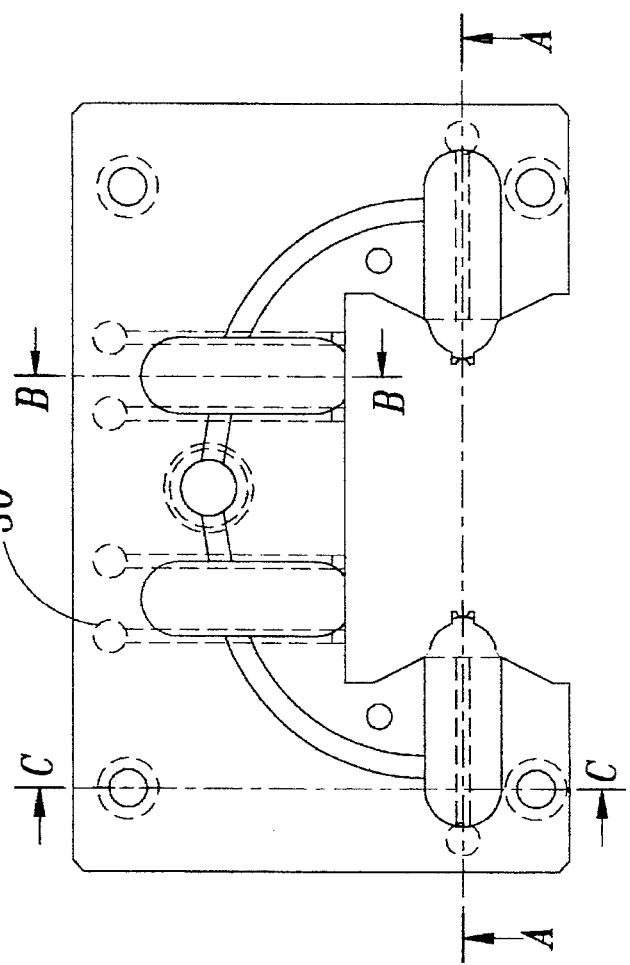
FIG. 11 is a sectional view of the end cap using the engaging snap springs.
Figure 11A:
FIG. 11A is a sectional view taken along line A—A of FIG. 11.
Figure 11C:
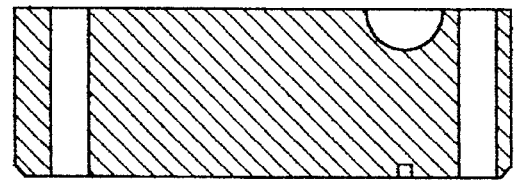
FIG. 11C is a sectional view taken along line C—C of FIG. 11.

The lateral groups of loaded ball members 5 are disposed between a Gothic type passage 3 of lateral concave surface 9 of the guide rail 1 and corresponding Gothic type passage 4 of lateral convex surface 10 of the slide block main body 7, forming a four-contact point structure to bear the load. The 90 degree semicircular turning groove 8 (as shown in FIG. 3) or a straight semicircular turning groove 17 (as shown in FIGS. 10, 11) is formed on the end caps 6 corresponding to the lateral ball members 5 for guiding the loaded ball members 5 into the unloaded ball member holes 19 of the slide block main body 7 to recirculate therein. The assistant turning block 14 is disposed in the turning groove 8, so that the ball members 5, can smoothly ascend or descend along two curve surfaces 24, 23 of the turning block 14 as shown in FIGS. 7 and 7A. As a result, the turning movement of the ball members 5, is smoothened. The assistant turning block 14 is fixed on the end cap 6 by fixing pin 25 as shown in FIG. 3 & 6. The fixing pin 25 also fixes the end cap 6 on the slide block main body 7. Four screws 26 go through four corners of the end cap 6 to lock the end cap 6 on a front and a rear face of the slide block main body 7 to integrally form the slide block 2 as shown in FIG. 1 & 3. The engaging snap spring 21 is supported by a projecting supporting section 27 of the end cap 6 and fastened in a hole 28 of the end cap 6 by the engaging seat 22 thereof so that the ball members 5 can only limitedly move within the snap spring 21. The upper ball members 15 contact with semicircular passage 11 of the slide block main body 7 and point passage 12 of the guide rail 1 so that the contact error of the lateral Gothic type turning grooves 3 & 4 can be freely adjusted or corrected and the upward loading force and torque can be shared.

Figure 5:
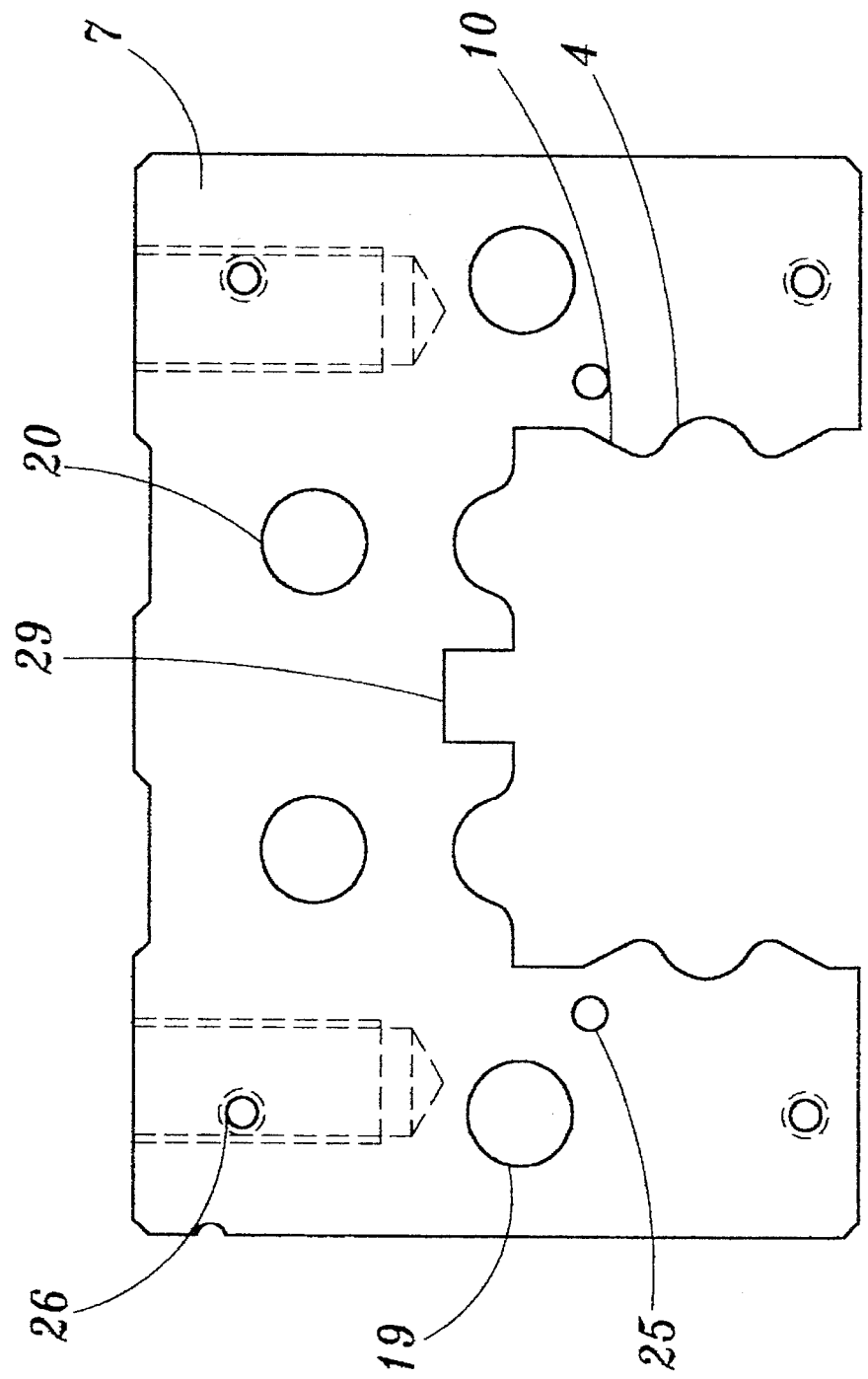
FIG. 5 is a sectional view of the slide block main body of the present invention.

The upper turning grooves 18 of the end cap 6 are such designed that the ball members 15 can self-pass therethrough by rolling contacting force and smoothly turn into the unloaded ball member hole 20 of the slide block main body 7 to recirculate therein as shown in FIG. 5. The retainer member 16 serves to hold the ball members 15 in the slide block 2 and is engaged with an locking groove 29 (FIG. 6) of the end cap 6, whereby the ball members 15 can only linearly move within the retainer member 16 (FIG. 9B). The retainer member 16 can be substituted by the engaging snap spring 21. Accordingly, the snap spring 21 is changed into a structure 30 as shown in FIG. 11, wherein four snap springs 21 are disposed in the end caps 6 to replace the retainer member 16. The end cap 6 is further formed with a lubricant passage 32 and a lubricant inlet 31, whereby the lubricant can be fed through the inlet 31 into the lubricant passage 32 to be distributed to the four passages of the ball members. In addition, a plastic wiper (not shown) can be added to the end cap 6 for wiping away the pollutant on the guide rail 1. A scraper (not shown) can be disposed under the end cap 6 for avoid entrance of the pollutant. Furthermore, for smoothening the turning movement, at an end of each ball member passage of the slide block main body 7 is ground an inclined crown angle for further smoothening the turning movement. It is to be understood that the above description and drawings are only used for illustrating one embodiment of the present invention, not intended to limit the scope thereof. Any variation and derivation from the above description and drawings should be included in the scope of the present invention.

What is claimed is:

1. A linear movement ball guideway comprising a slide block and a guide rail, wherein said slide block is composed of a slide block main body and two end caps and said guide rail is formed with two lateral concave surfaces while said slide block is formed with a corresponding convex surface and said concave surface and convex surface are formed with Gothic type ball member grooves defining lateral ball member passages within which multiple loaded and unloaded ball members roll, said slide block comprising an upper portion including two lateral sides in proximity to which are formed semicircular surfaces defining upper ball member passages, a top point of said loaded ball members contacting with said semicircular surface, while a bottom point of said loaded ball members contacting an upper surface of said guide rail, said ball member having limited between said end caps of said slide block by a retainer member to linearly move therewithin, said ball members turning through said end caps in a three-ball pushing turning manner with an optimal short distance, two groups of said ball members being disposed on said upper side of said guide rail to bear upper load and torque and adjust the pre-load and installation accuracy of two lateral groups of said ball members.

2. A ball guideway as claimed in claim 1, wherein an engaging snap spring means is disposed between end caps to hold said lateral groups of ball members and prevent the same from dropping outside said guide rail.

3. A ball guideway as claimed in claim 1, wherein said upper groups of ball members are held by a retainer member.

4. A linear movement ball guideway comprising a slide block and a guide rail, wherein said slide block is composed of a slide block main body and two end caps and said guide rail is formed with two lateral concave surfaces while said slide block is formed with a corresponding convex surface and said concave surface and convex surface are formed with Gothic type ball member grooves defining lateral ball member passages within which multiple loaded and unloaded ball members roll, said ball member passages of said end caps include a 90 degree lateral turning groove, an assistant turning block being disposed in said 90 degree lateral turning groove for smoothening the ascending and descending movements of said ball members, said end caps being engaged with said slide block main body by fixing pins.

5. A linear movement ball guideway comprising a slide block and a guide rail engaged by said slide block; said slide block comprising a pair of upper turning grooves and a locking groove disposed between said pair of upper turning grooves for receiving a retainer member.

6. The linear movement ball guideway of claim 5 wherein said slide block comprises a pair of convex surfaces with each convex surface being defined by a pair of rising generally flat surfaces, both of which terminate in a slide body Gothic type passage, and said guide rail includes a pair of concave surfaces with each concave surface being defined by a pair of descending generally flat surfaces, both of which terminate in a guide rail Gothic type passage such that as said guide rail is engaged to said slide block, said pair of descending generally flat surfaces of said concave surfaces of said guide rail proximally mate with said pair of rising generally flat surfaces of said convex surfaces of said slide body.

* * * * *